United States Patent
Nonez et al.

(10) Patent No.: US 11,176,182 B2
(45) Date of Patent: Nov. 16, 2021

(54) APPLYING APPROXIMATE MEASURE VALUES FROM DISSIMILAR MAPS

(71) Applicant: INTERNATIONAL BUSINESS MACHINES CORPORATION, Armonk, NY (US)

(72) Inventors: Robert Nonez, Ontario (CA); A A Kasun Attanapola, Ontario (CA); Ilse M. Breedvelt-Schouten, Ontario (CA); Charlie Le, Ottawa (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 103 days.

(21) Appl. No.: 16/818,147

(22) Filed: Mar. 13, 2020

(65) Prior Publication Data
US 2021/0286829 A1 Sep. 16, 2021

(51) Int. Cl.
*G06F 16/2458* (2019.01)
*G06F 16/2457* (2019.01)
*G06F 16/29* (2019.01)
*G06F 16/248* (2019.01)

(52) U.S. Cl.
CPC ............ *G06F 16/29* (2019.01); *G06F 16/248* (2019.01); *G06F 16/2458* (2019.01); *G06F 16/24578* (2019.01)

(58) Field of Classification Search
CPC .................................. G06F 16/29; G06F 16/24
See application file for complete search history.

(56) References Cited

U.S. PATENT DOCUMENTS

| 8,799,074 | B2 | 8/2014 | Simmons |
| 10,531,626 | B1* | 1/2020 | Grams .................... A01H 5/10 |
| 2009/0210388 | A1 | 8/2009 | Elson et al. |
| 2019/0171657 | A1 | 6/2019 | Ambler et al. |
| 2021/0035265 | A1* | 2/2021 | Young .................... G06T 7/187 |
| 2021/0182626 | A1* | 6/2021 | Revaud ............... G06N 3/0445 |

FOREIGN PATENT DOCUMENTS

KR 101667875 B1 10/2016

OTHER PUBLICATIONS

Mell et al., "The NIST Definition of Cloud Computing", NIST, Special Publication 800-145, Sep. 2011, 7 pages.

* cited by examiner

*Primary Examiner* — Pierre M Vital
*Assistant Examiner* — Vy H Ho
(74) *Attorney, Agent, or Firm* — Robert Shatto; Andrew D. Wright; Roberts Calderon Safran & Cole, P.C.

(57) ABSTRACT

A method including: receiving a base map that is divided into geographical base regions, each of the geographical base regions having a measure of a first parameter; receiving a plurality of secondary maps that are each divided into a plurality of geographical regions, each of the geographical regions having a measure of a secondary parameter; determining a total overlap percentage for each of the secondary maps relative to the base map, the total overlap percentage for one of the secondary maps being an average of overlap percentages of each of the geographical regions of the one of the secondary maps with the geographical base regions of the base map; receiving a selection of one of the secondary maps; and applying the secondary parameter of the selected secondary map to each of the geographical base regions of the base map.

20 Claims, 8 Drawing Sheets

APPLYING APPROXIMATE MEASURE VALUES FROM DISSIMILAR MAPS

BACKGROUND

Aspects of the present disclosure relate generally to combining information on maps and, more particularly, to combining information from dissimilar maps by reconfiguring overlapping geographical regions.

Geospatial analysis is an important aspect of many business analytics applications. It is used to help decision makers visualize and understand the distribution of their data over a geographical region. When performing geospatial analysis, a business analytics application may be loaded with pre-created maps. Each map may contain shapes, polygons, or regions that represent area and data measures in that area. This allows a user to analyze a geographical area against an existing map and see the measures applied to the geographical area.

SUMMARY

In a first aspect of the disclosure, there is a computer-implemented method including: receiving, by a computing device, a base map, the base map being divided into a plurality of geographical base regions, each of the geographical base regions having a measure of a first parameter; receiving, by the computing device, a plurality of secondary maps from a library of maps, each of the secondary maps being divided into a plurality of geographical regions, each of the geographical regions having a measure of at least one secondary parameter; determining, by the computing device, a total overlap percentage for each of the secondary maps relative to the base map, the total overlap percentage for a particular one of the secondary maps being an average of overlap percentages of each of the geographical regions of the particular one of the secondary maps with the geographical base regions of the base map; creating, by the computing device, a ranked list of the secondary maps based on the total overlap percentage of each of the secondary maps; receiving, by the computing device, a selection of one of the secondary maps displayed in the list; and applying, by the computing device, the secondary parameter of the selected secondary map to each of the geographical base regions of the base map, the applying to a particular one of the geographical base regions being in accordance with the measure of the secondary parameter of the geographical region of the selected secondary map that overlaps the particular one of the geographical base regions more than any other one of the geographical regions of the selected secondary map.

In another aspect of the disclosure, there is a computer program product including one or more computer readable storage media having program instructions collectively stored on the one or more computer readable storage media. The program instructions are executable to: receive a base map, the base map being divided into a plurality of geographical base regions, each of the geographical base regions having a measure of a first parameter; receive a plurality of secondary maps from a library of maps, each of the secondary maps being divided into a plurality of geographical regions, each of the geographical regions having a measure of at least one secondary parameter; determine a total overlap percentage for each of the secondary maps relative to the base map, the total overlap percentage for a particular one of the secondary maps being an average of overlap percentages of each of the geographical regions of the particular one of the secondary maps with the geographical base regions of the base map; create a ranked list of the secondary maps based on the total overlap percentage of each of the secondary maps; receive a selection of one of the secondary maps displayed in the list; and apply the secondary parameter of the selected secondary map to each of the geographical base regions of the base map, the applying to a particular one of the geographical base regions being in accordance with the measure of the secondary parameter of the geographical region of the selected secondary map that overlaps the particular one of the geographical base regions more than any other one of the geographical regions of the selected secondary map.

In another aspect of the disclosure, there is system including a processor, one or more computer readable storage media, and program instructions collectively stored on the one or more computer readable storage media. The program instructions are executable to: receive a base map, the base map being divided into a plurality of geographical base regions, each of the geographical base regions having a measure of a first parameter; receive a plurality of secondary maps from a library of maps, each of the secondary maps being divided into a plurality of geographical regions, each of the geographical regions having a measure of at least one secondary parameter; determine a total overlap percentage for each of the secondary maps relative to the base map, the total overlap percentage for a particular one of the secondary maps being an average of overlap percentages of each of the geographical regions of the particular one of the secondary maps with the geographical base regions of the base map; create a ranked list of the secondary maps based on the total overlap percentage of each of the secondary maps; receive a selection of one of the secondary maps displayed in the list; and apply the secondary parameter of the selected secondary map to each of the geographical base regions of the base map, the applying to a particular one of the geographical base regions being in accordance with the measure of the secondary parameter of the geographical region of the selected secondary map that overlaps the particular one of the geographical base regions more than any other one of the geographical regions of the selected secondary map.

BRIEF DESCRIPTION OF THE DRAWINGS

Aspects of the present disclosure are described in the detailed description which follows, in reference to the noted plurality of drawings by way of non-limiting examples of exemplary embodiments of the present disclosure.

DETAILED DESCRIPTION

Figure 1:
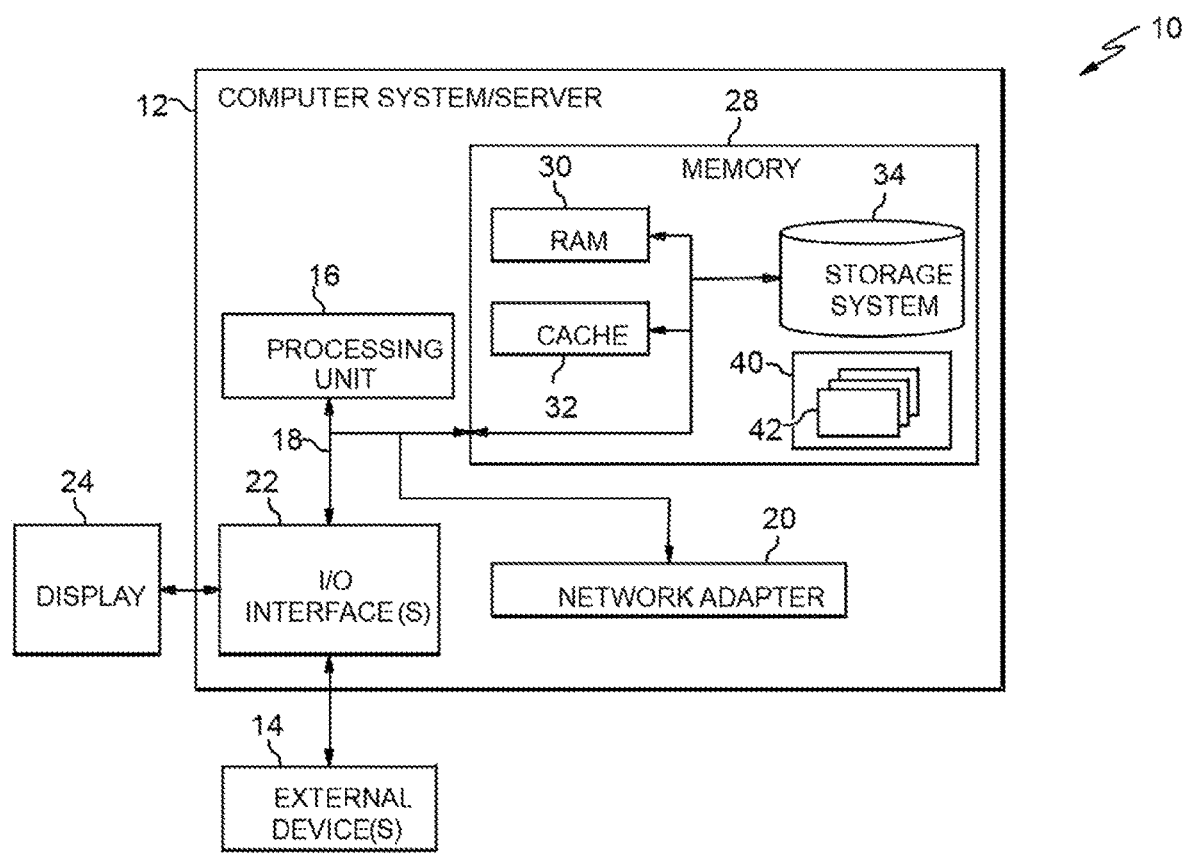
FIG. 1 depicts a cloud computing node according to an embodiment of the present invention.

Aspects of the present disclosure relate generally to combining information on maps and, more particularly, to combining information from dissimilar maps by reconfiguring overlapping geographical regions. According to aspects of the disclosure, the measure of a parameter shown in regions on a secondary map is applied to a base map having different regions than the secondary map. In aspects of the disclosure, the differences in the regions of the base map and the secondary map are size and/or shape. In embodiments, the regions of the base map are overlaid with the regions of the secondary map and a computing device determines a percentage overlap of the regions. The computing device then applies to each region of the base map the measure of the parameter in the region of the secondary map that has the largest overlap with that particular region of the base map. In this manner, implementations of the disclosure take a measure of a parameter shown on a secondary map that is split into different regions than a base map, and apply that measure of the parameter to the regions of the base map. This shows a user estimated values of parameters shown in one map (the secondary map) as they relate to regions of a different map (the base map).

When performing geospatial analysis, a business analytics application may be loaded with pre-created maps. Each map may contain regions, shapes, or polygons that represent area and data measures. This allows a user to analyze a geographical area against an existing map and see the measures applied to the geographical area. As an example, a problem that sometimes arises is that a land developer, for example, may have a map of polygons or regions representing areas on which the developer wishes to build houses. It is important to the developer's decision making to be able to look at any applicable data/measures (parameters) that apply to its potential development areas. The problem is that in current geospatial analysis solutions, if a user has multiple maps that represent the same geographical area but use dissimilarly shaped and/or sized regions, there is no easy way to apply a measure from one map's regions to another map's regions.

Embodiments of the disclosure include a computer-implemented process for applying approximate measure values from dissimilar geographical maps onto a target map. The computer-implemented process includes: in response to receiving data representative of (1) a library of existing maps containing polygons and measures for each map and (2) a target map of interest, containing custom polygons and measures, comparing the target map of interest to the library of existing maps, wherein a comparison comprises maps at a same hierarchy level, including alternate hierarchies representative of a same geographical area; determining an overlapping percentage between custom polygons of the target map of interest and the polygons in maps of the library of existing maps; calculating a similarity between the custom polygons of the target map of interest and the polygons in maps of the library of existing maps based on a predetermined configurable overlapping threshold value; ranking maps based on parameters including polygon similarity, overlapping percentage, and adjusted weighting based on factors including population density, surface map data and machine learning results for default weight measure values; and, in response to receiving from a user a selected map from a returned ranking of maps and a selected measure associated with the selected map, applying the selected measures from the selected map to the target map of interest.

Implementations of the disclosure are improvements to the functioning of a computer. For example, determining an overlap percentage of regions of a secondary map and regions of a base map can improve the accuracy of a computer system that estimates measures of parameters between maps having different shaped and/or sized regions. In addition, implementations of the disclosure include features that are not well understood, routine, or conventional activity in the relevant art. For example, determining a total overlap percentage for a particular secondary map that is an average of overlap percentages of each of the geographical regions of the particular secondary map with the geographical base regions of the base map, is not well-understood, routine, or conventional.

It is to be understood that the aforementioned advantages, as well as other advantages described herein, are example advantages and should not be construed as limiting. Embodiments of the present disclosure can contain all, some, or none of the advantages while remaining within the spirit and scope of the present disclosure.

It should be understood that, to the extent implementations of the disclosure collect, store, or employ personal information provided by, or obtained from, individuals, such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
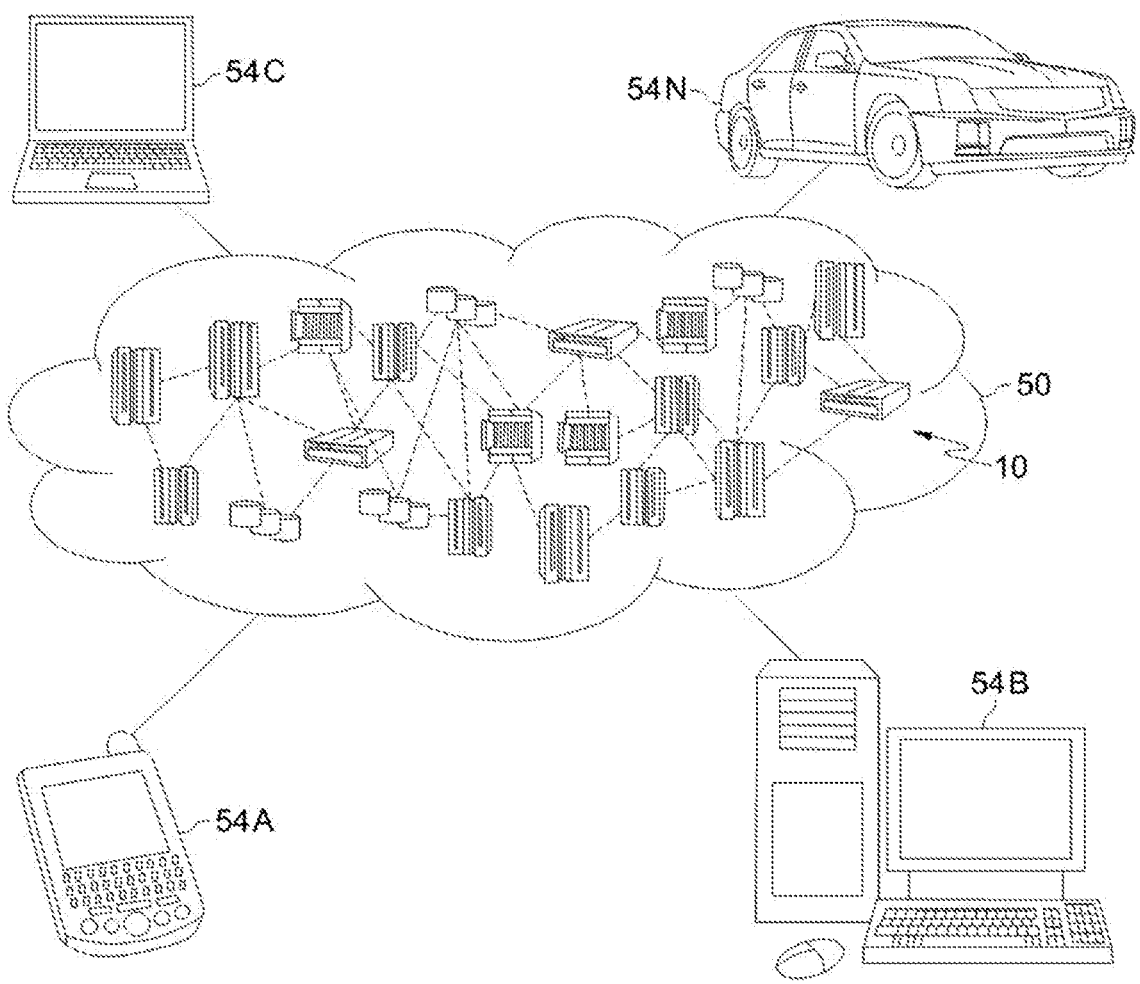
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
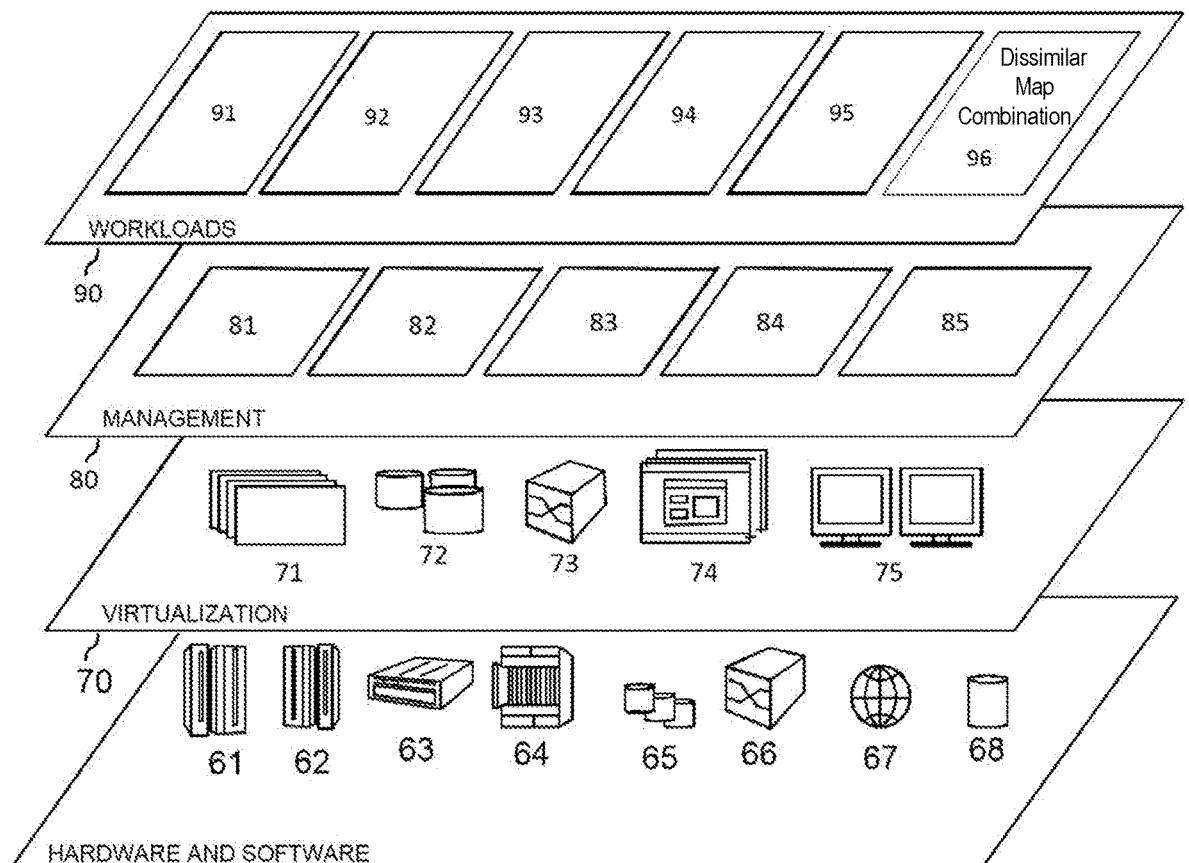
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and dissimilar map combination 96.

Implementations of the disclosure may include a computer system/server 12 of FIG. 1 in which one or more of the program modules 42 are configured to perform (or cause the computer system/server 12 to perform) one of more functions of the dissimilar map combination 96 of FIG. 3. For example, the one or more of the program modules 42 may be configured to: receive a base map, the base map being divided into a plurality of geographical base regions, each of the base regions having a measure of a first parameter; receive a plurality of secondary maps from a library of maps, each of the secondary maps being divided into a plurality of geographical regions, each of the geographical regions having a measure of at least one secondary parameter; determine a total overlap percentage for each of the secondary maps relative to the base map, the total overlap percentage for a particular one of the secondary maps is an average of overlap percentages of each of the geographical regions of the particular one of the secondary maps with the geographical base regions of the base map; create a ranked list of the secondary maps based on the total overlap percentage of each of the secondary maps; receive a selection of one of the secondary maps displayed in the list; and apply the secondary parameter of the selected secondary map to each of the geographical base regions of the base map, the applying to a particular one of the geographical base regions being in accordance with the measure of the secondary parameter of the geographical region of the selected secondary map that overlaps the particular one of the geographical base regions more than any other one of the geographical regions of the selected secondary map.

Figure 4:
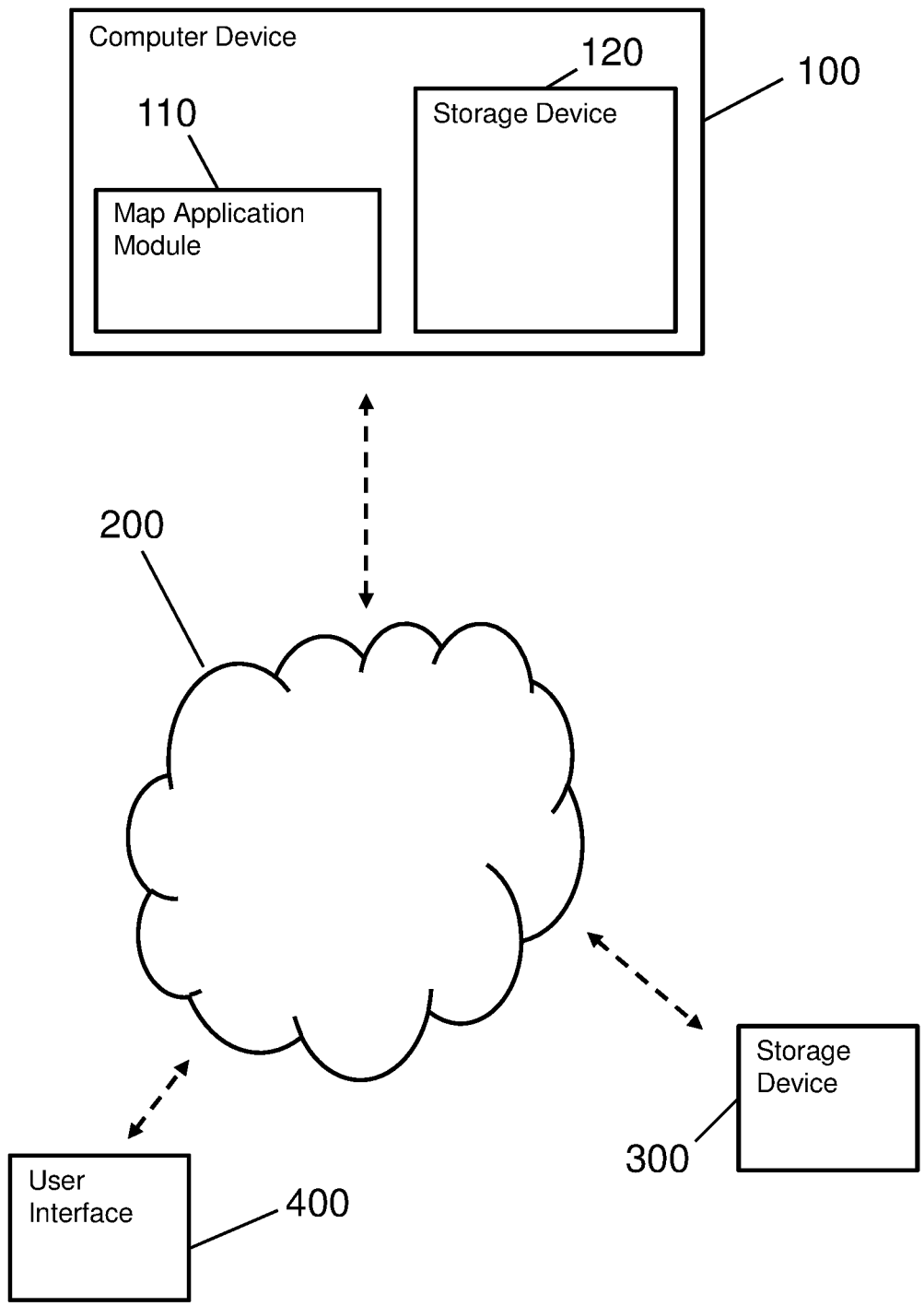
FIG. 4 shows a block diagram of an exemplary environment in accordance with aspects of the disclosure.

FIG. 4 shows a block diagram of an exemplary environment in accordance with aspects of the disclosure. In embodiments, the environment includes a computer device 100 such as, for example, computer system/server 12 in FIG. 1, that communicates over one or more networks 200 such as, for example, cloud computing environment 50. In this example, computer device 100 includes a map application module 110, for example, one or more of program modules 42 in FIG. 1, and a storage device 120 such as, for example, storage system 34 in FIG. 1.

FIG. 4 shows an external storage device 300 such as, for example, another computer device having some or all of the features of computer system/server 12 in FIG. 1, that is external to computer device 100 and contains a map library that is accessed by map application module 110 (other examples include more than one external storage device 300). In embodiments, one or more other databases that are accessed by map application module 110 are stored on storage device 120 and/or storage device 300.

FIG. 4 shows a user interface 400 such as, for example, display 24 in FIG. 1, that displays output from computer device 100 and/or map application module 110. In embodiments, user interface 400 is a user device such as, for example, a desktop computer, laptop computer, tablet computer, smartphone, etc., that includes one or more components of system 12 and that communicates with computer device 100 via network 200.

In embodiments, computer device 100 comprises map application module 110, which may comprise one or more program modules such as program modules 42 described with respect to FIG. 1. Computer device 100 may include additional or fewer modules than those shown in FIG. 4. In embodiments, separate modules may be integrated into a single module. Additionally, or alternatively, a single module may be implemented as multiple modules. Moreover, the quantity of devices and/or networks in the environment is not limited to what is shown in FIG. 4. In practice, the environment may include additional devices and/or networks; fewer devices and/or networks; different devices and/or networks; or differently arranged devices and/or networks than illustrated in FIG. 4.

Embodiments of the disclosure provide a way to include measure values of one or more parameters from other similar, but non-identical, maps onto a first map. Embodiments achieve this by ranking available maps based on region size and/or shape similarity and then calculating the approximate measure values of a selected second map as they relate to the regions of the first map. Embodiments additionally use weighting improvements based on geological map adjustments. These (approximate) measure values are then rendered onto the first map on, for example, a digital display.

Advantages to embodiments of the disclosure include: the ability for business, or other, users to use maps and their measures interchangeably, even if the regions of the maps do not completely overlap; the approximate measure values generated by embodiments of the disclosure are often sufficiently precise for business users to make business decisions; using geological map information to improve the measure value calculations rendered onto a first map provides a means to improve the approximate values; and reducing confusion for users trying to determine how the measure values of parameters shown on a second map having given regions apply to a first map having different size and/or shape regions.

Embodiments of the disclosure include business analytics applications. Embodiments are used when a user is performing geospatial analyses. More specifically, embodiments are used when multiple maps exist for the same geographical area and the user desires to know if there are any measures of parameters on one map that can be applied to another map.

Figure 5:
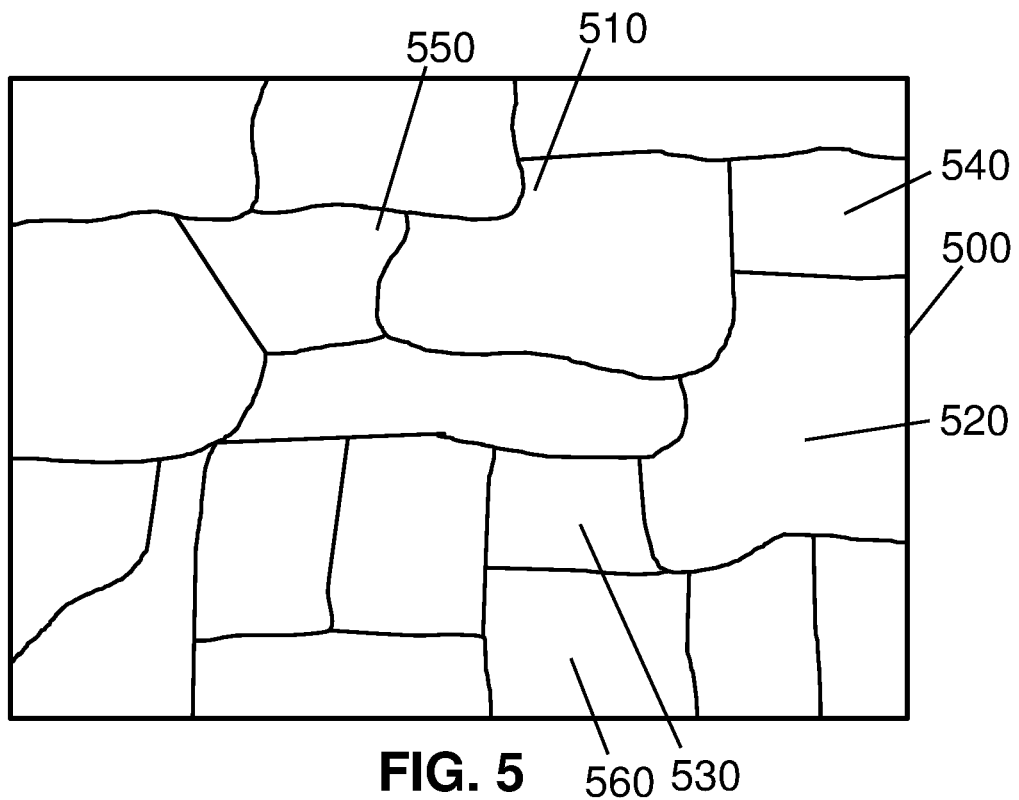
FIG. 5 shows an example of a base map in accordance with aspects of the disclosure.

FIGS. 5-10 show an exemplary embodiment of the disclosure. FIG. 5 shows a base map 500 that, for example, represents a portion of State X in the United States. Base map 500 is divided into a plurality of regions including regions 510, 520, 530, 540, 550 and 560. In this example, each of the regions of base map 500 represent a different school district. Each region includes a measure of a parameter such as, for example, the number of schools in the region. A housing developer may be interested in the number of schools in a particular region to determine whether or not it should build new homes in that region. The developer in this example may also be interested in other parameters in the region that influence potential buyers of new homes.

Figure 6:
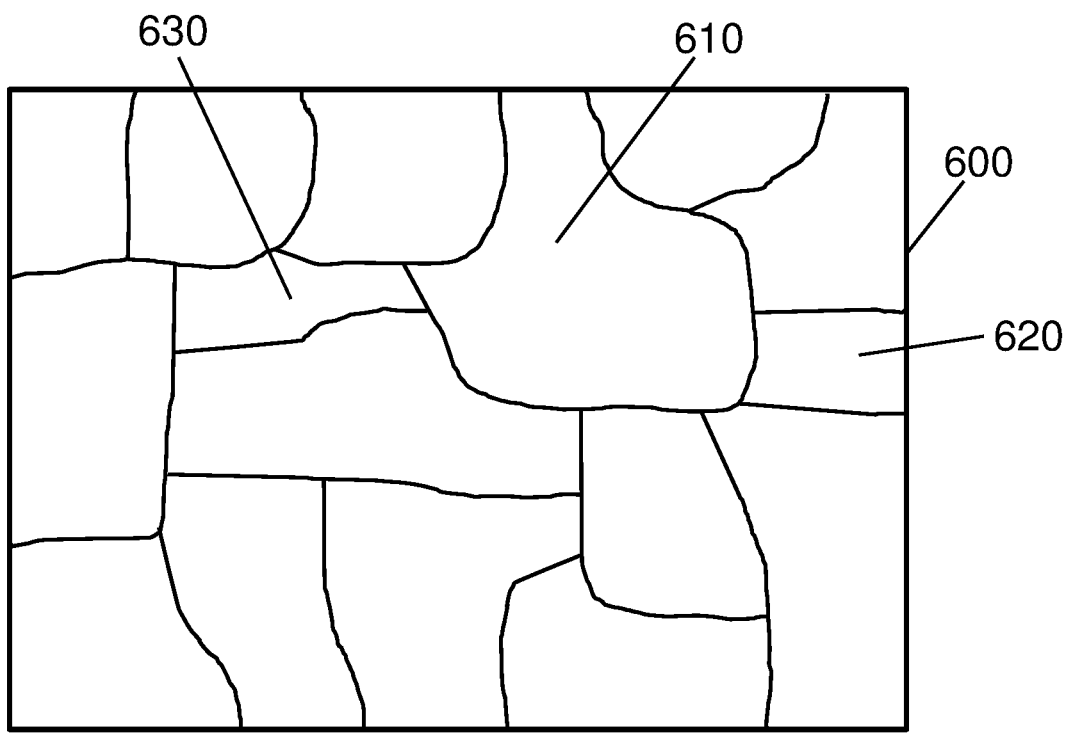
FIG. 6 shows an example of a secondary map in accordance with aspects of the disclosure.

FIG. 6 shows a secondary map 600 that, for example, represents the same portion of State X that is represented by base map 500. Secondary map 600 is divided into a plurality of regions including regions 610, 620 and 630. In this example, each of the regions of secondary map 600 represent a different housing subdivision. For each region, secondary map 600 includes a measure of a parameter such as, for example, the number of grocery stores in the region. The developer would like to have an estimate of how many grocery stores are in each of the school districts shown in base map 500. However, secondary map 600 is divided into regions (housing subdivisions) that are different from the regions (school districts) into which base map 500 is divided.

In embodiments, map application module 110 retrieves base map 500 from storage device 120. In other embodiments, map application module 110 retrieves base map 500 from storage device 300 through network 200. In this example, a user (such as the housing developer) selects secondary map 600 from storage device 300 using user interface 400. In other embodiments, the user selects secondary map 600 from storage device 120 using user interface 400. In embodiments, one or both of base map 500 and secondary map 600 are part of a map library stored on storage device 120, storage device 300, and/or some other storage device. In embodiments, one or more of the map libraries contain more than one secondary map. In embodiments, the maps in the map libraries have one of a plurality of hierarchies. The hierarchies are, in this example, types of areas. For example, the hierarchies include country, state, province, county, city and a portion of any of these. Embodiments include other hierarchies. In the example shown in FIGS. 5-10, the hierarchy is a portion of a state (State X in this example). Embodiments present to a user maps having the same hierarchy and allow the user to select one or more of the maps that contain the desired parameter or parameters.

Figure 7:
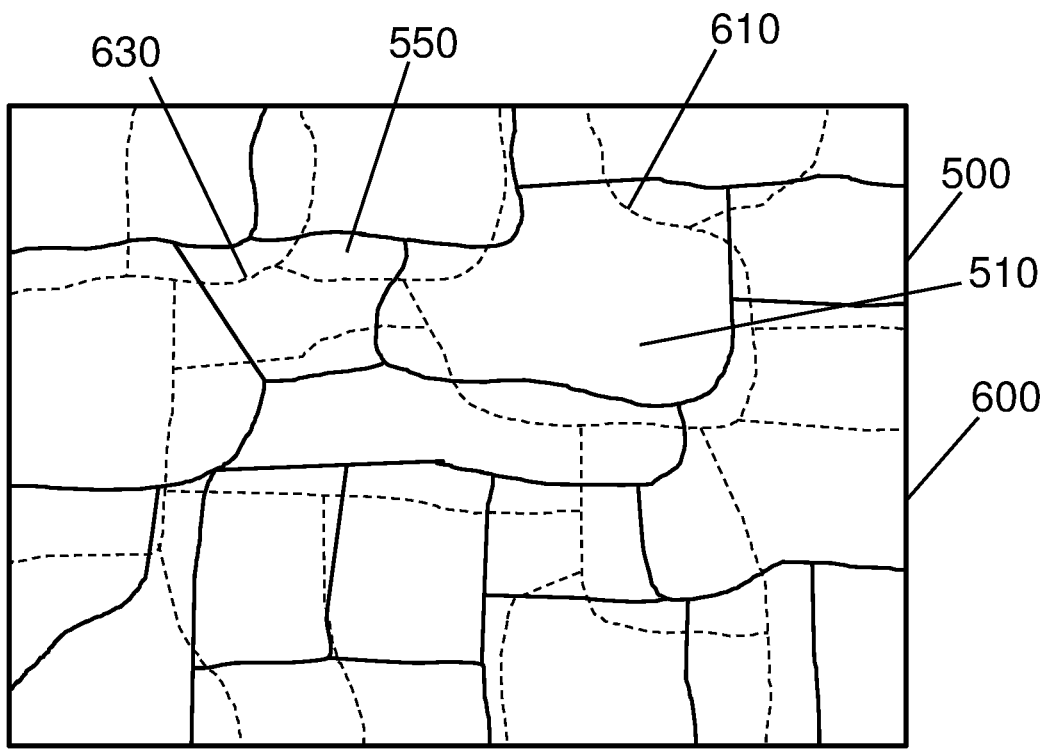
FIG. 7 shows an example of a secondary map overlaying a base map in accordance with aspects of the disclosure.

Map application module 110 then combines secondary map 600 and base map 500 and, in some embodiments, displays secondary map 600 overlaying base map 500 on user interface 400. In embodiments, user interface 400 is a digital display or monitor. FIG. 7 shows secondary map 600 overlaying base map 500. In FIG. 7, the regions of secondary map 600 are shown in dashed lines for clarity. As can be seen in FIG. 7, the regions of secondary map 600 do not align with the regions of base map 500.

Embodiments of the disclosure provide an estimate of one or more parameters in secondary map 600 for each region of base map 500. Map application module 110 determines an overlap percentage for each region on secondary map 600 relative to one or more regions of base map 500. In embodiments, base map 500 contains data defining the border of each of the regions of base map 500, and secondary map 600 contain data defining the border of each of the regions of secondary map 600. In embodiments, map application module 110 compares the data defining the borders of each region from both base map 500 and secondary map 600 to determine the overlap percentage. For example, referring to FIG. 7, region 610 of secondary map 600 overlaps region 510 of base map 500. In embodiments, map application module 110 determines the overlap percentage of each of the regions of secondary map 600 by determining which of the regions of secondary map 600 has the greatest amount of overlap with each of the regions of base map 500. In this example, multiple regions of secondary map 600 overlap region 510, but region 610 overlaps region 510 more than any other region of secondary map 600. Map application module 110 determines the amount (80% in this example) region 610 overlaps region 510. As a result, map application module 110 uses the overlap (80%) of region 610 as the overlap of region 610 relative to region 510 of base map 500. Map application module 110 performs a similar determination of overlap percentage for each of the regions of base map 500. As another example, referring again to FIG. 7, region 630 of secondary map 600 overlaps region 550 of base map 500. In this example, multiple regions of secondary map 600 overlap region 550, but region 630 overlaps region 550 more than any other region of secondary map 600. Map application module 110 determines that 70%, for example, of region 630 overlaps region 550. As a result, map application module 110 uses the overlap (70%) of region 630 as the overlap of secondary map 600 relative to region 550 of base map 500.

Map application module 110 determines a total overlap percentage for secondary map 600 relative to base map 500. In embodiments, the total overlap percentage of secondary map 600 is equal to the average of the overlap percentages of each of the regions of base map 500. In embodiments, map application module 110 determines the total overlap percentage for every map in the map library that is of interest to the user.

In embodiments, map application module 110 creates a ranked list of the maps in which the maps are ranked by total overlap percentage. In embodiments, map application module 110 includes in the ranked list only those maps having a total overlap percentage above a threshold such as, for example, 50% total overlap. In embodiments, map application module 110 uses a threshold of 70% to ensure only maps with more similar regions are used. Other embodiments use a threshold of a different percentage. A purpose of including only those maps above a threshold is to eliminate those maps having regions that do not adequately overlap the regions of base map 500 and, as a result, would not provide a sufficiently accurate estimate of the maps parameter as it relates to the regions of base map 500.

In the example shown in FIG. 7, map application module 110 determines that secondary map 600 has a total overlap percentage that is above the threshold of 50% and, as a result, includes secondary map 600 in the ranked list. The user selects secondary map 600 from the ranked list and map application module 110 then applies the parameter of secondary map 600 to the regions of base map 500. For example, map application module 110 applies the number of grocery stores (the parameter of secondary map 600) in region 610 to region 510 because region 610 had the highest overlap percentage of all the regions of secondary map 600 relative to region 510 of base map 500. In embodiments, map application module 110 applies the parameter of secondary map 600 as an absolute number (for example, the total number of grocery stores), while in other embodiments, map application module 110 applies the parameter of secondary map 600 as a number per unit area (for example, the number of grocery stores per square mile).

Figure 8:
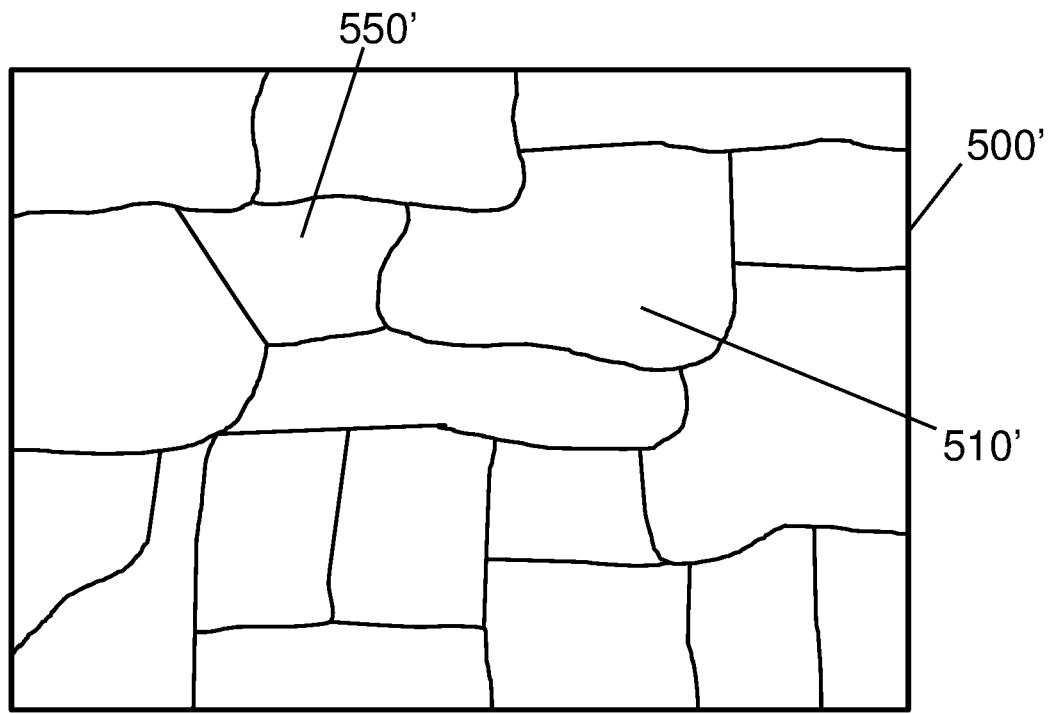
FIG. 8 shows an example of a base map with a secondary parameter in accordance with aspects of the disclosure.

In embodiments, map application module 110 outputs instructions to user interface 400 to display base map 500 including the parameter of one or more maps such as, for example, secondary map 600. FIG. 8 shows base map 500' that includes region 550' that displays both the parameter (number of schools) of region 550 of base map 500 and the parameter (number of grocery stores) of region 630 of secondary map 600. Similarly, region 510' displays both the parameter (number of schools) of region 510 of base map 500 and the parameter (number of grocery stores) of region 610 of secondary map 600.

Figure 9:
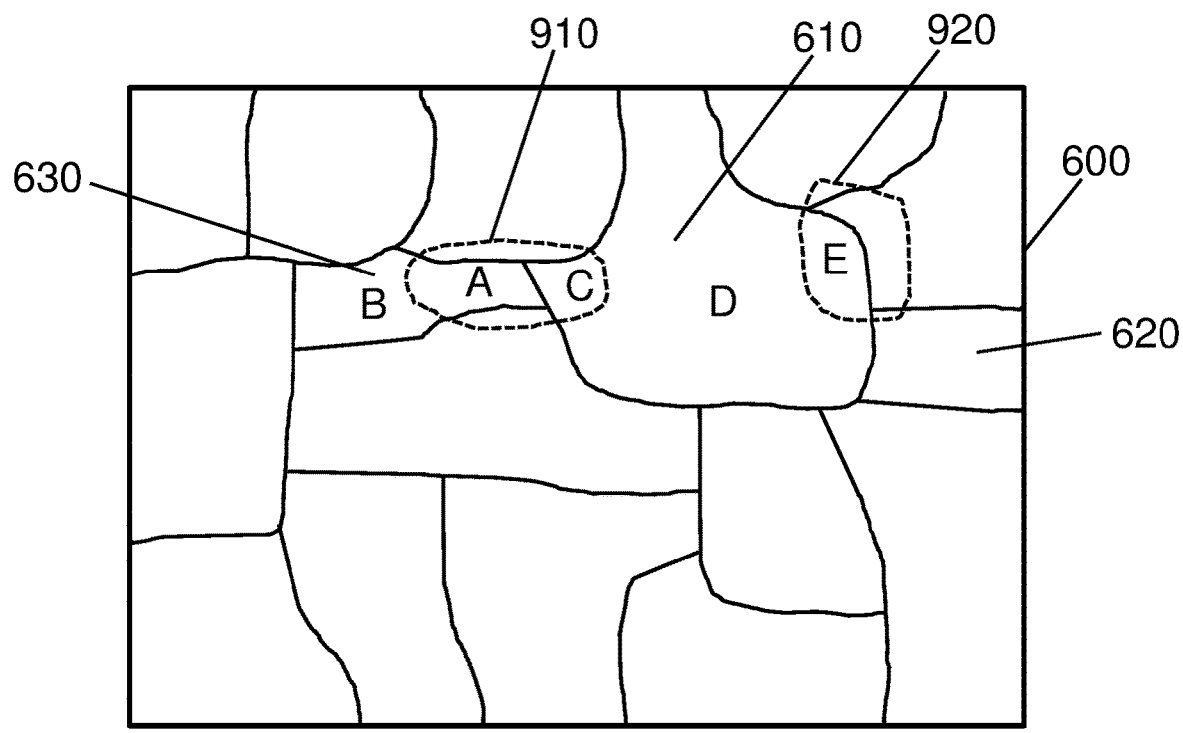
FIG. 9 shows an example of a secondary map including geographical features in accordance with aspects of the disclosure.

In embodiments, map application module 110 considers geographical features of the regions of secondary map 600 and weights the parameter of secondary map 600 accordingly. For example, FIG. 9 shows a lake 910 that partially covers regions 610 and 630 of secondary map 600, and a forest 920 that partially covers region 610. In embodiments, map application module 110 considers these (and other) geographical features as indications of uninhabitable areas and weights the parameter of secondary map 600 accordingly. For example, region 630 is shown having a subregion A that is covered by lake 910 and a subregion B that is not covered by lake 910. In this example, subregion B is 60% of the total area of region 630. Map application module 110 considers subregion A uninhabitable and, therefore, weights the parameter of region 630 by dividing the number of grocery stores in region 630 by 60% to more accurately represent the number of grocery stores relative to the inhabitable area of region 630.

As another example, region 610 is shown having a subregion C that is covered by lake 910, a subregion E that is covered by forest 920, and a subregion D that is not covered by lake 910 or forest 920. In this example, subregion D is 90% of the total area of region 610. Map application module 110 considers subregions C and E uninhabitable and, therefore, weights the parameter of region 610 by dividing the number of grocery stores in region 610 by 90% to more accurately represent the number of grocery stores relative to the inhabitable area of region 610. In embodiments, map application module 110 applies weighting similar to that explained above using one or more population density maps or other maps that indicate uninhabitable areas.

Figure 10:
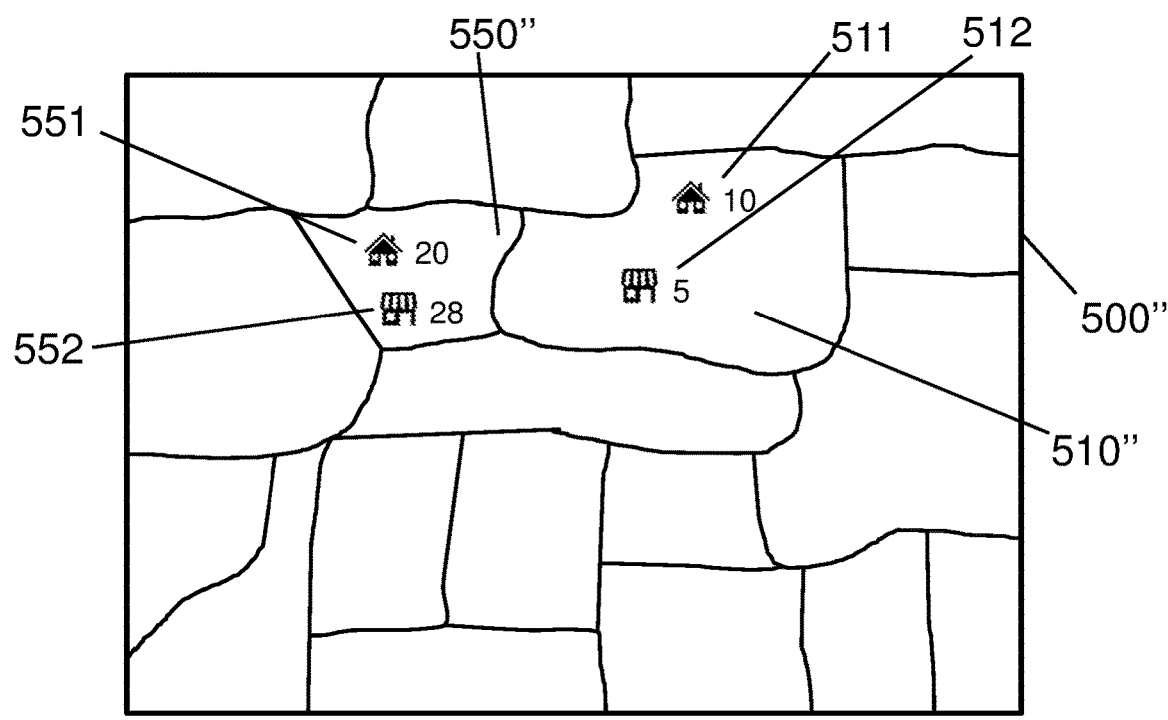
FIG. 10 shows an example of a base map with a secondary parameter weighted in accordance with aspects of the disclosure.

In embodiments, map application module 110 outputs instructions to user interface 400 to display base map 500 including the parameter of one or more maps such as, for example, secondary map 600 including weightings such as those shown in FIG. 9. FIG. 10 shows base map 500" that includes region 550" that displays both the parameter 551 (number of schools, which is 20) of region 550 of base map 500 and the parameter 552 (number of grocery stores, which is 28) of region 630 of secondary map 600 where the parameter of region 630 is weighted as described relative to FIG. 9. Similarly, region 510" displays both the parameter 511 (number of schools, which is 10) of region 510 of base map 500 and the parameter 512 (number of grocery stores, which is 5) of region 610 of secondary map 600 where the parameter of region 610 is weighted as described relative to FIG. 9. In embodiments, map application module 110 includes weightings (for example, the above-described weightings) when map application module 110 creates the ranked list of the maps.

In embodiments, map application module 110 receives input from the user to adjust the distribution of measures of the parameters based on the percentage of overlap with geographical features or any other factor chosen by the user. In embodiments, map application module 110 applies machine learning based on, for example, previous user input, to adjust weighting calculations based on previous uses, current population density data, and/or any other factor.

Figure 11:
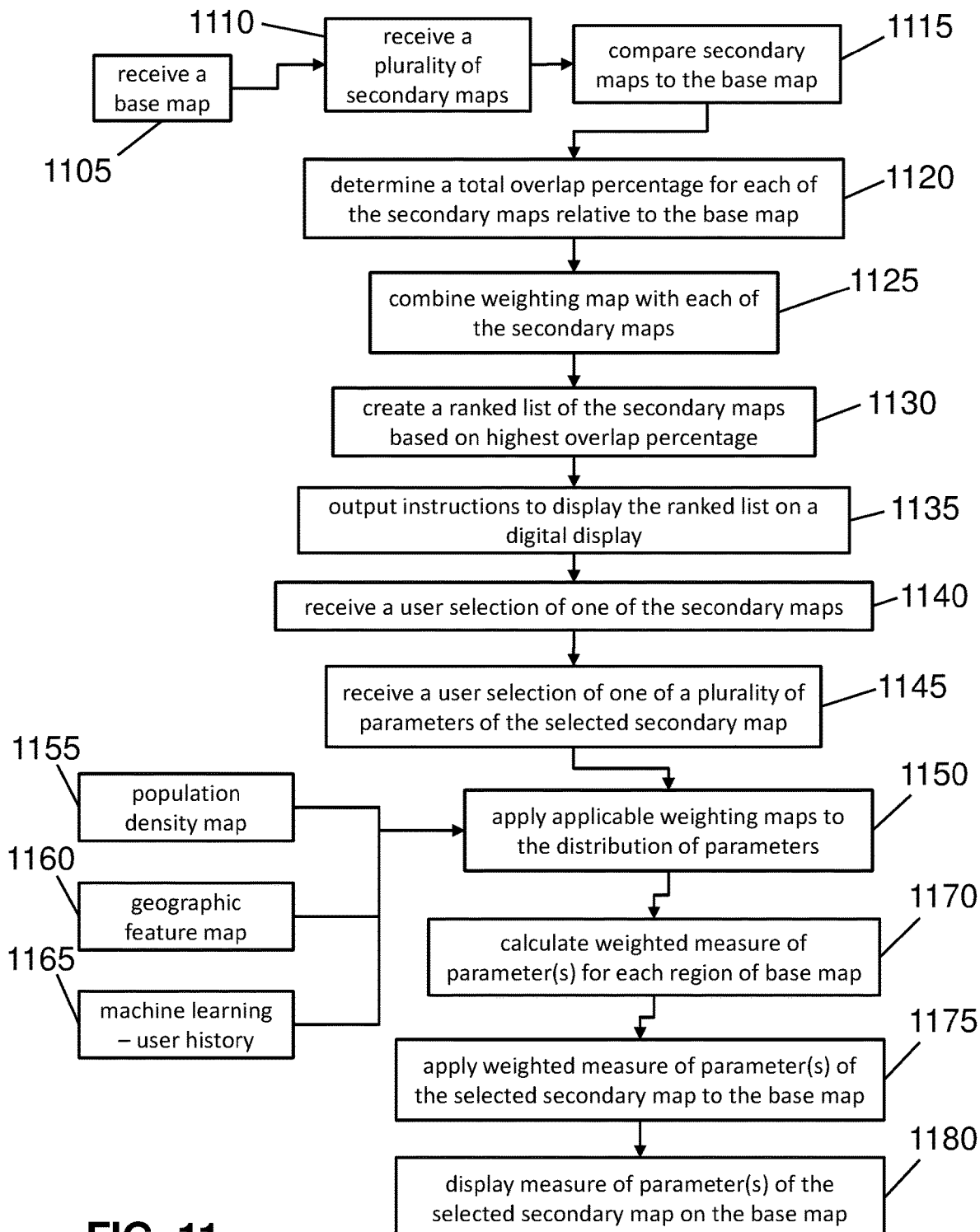
FIG. 11 shows a flowchart of an exemplary method in accordance with aspects of the disclosure.

FIG. 11 shows a flowchart of an exemplary method in accordance with aspects of the present disclosure. Operations of the method may be carried out in the environment of FIG. 4 and are described with reference to elements depicted in FIG. 4.

At operation 1105, the system receives a base map. In embodiments, and as described with respect to FIGS. 4-10, map application module 110 receives base map 500 from a map library stored on storage device 120.

At operation 1110, the system receives a plurality of secondary maps. In embodiments, and as described with respect to FIGS. 4-10, map application module 110 receives secondary map 600 from a map library stored on storage device 300.

At operation 1115, the system compares secondary maps to the base map. In embodiments, and as described with respect to FIGS. 4-10, map application module 110 compares secondary map 600 to base map 500.

At operation 1120, the system determines a total overlap percentage for each of the secondary maps relative to the base map. In embodiments, and as described with respect to FIGS. 4-10, map application module 110 determines a total overlap percentage for secondary map 600 relative to base map 500.

At operation 1125, the system combines a weighting map with each of the secondary maps. In embodiments, and as described with respect to FIGS. 4-10, map application module 110 combines weightings resulting from lake 910 and/or forest 920 with secondary map 600 to adjust the overlap percentage based on uninhabitable areas such as lake 910 and/or forest 920.

At operation 1130, the system creates a ranked list of the secondary maps based on highest overlap percentage. In embodiments, and as described with respect to FIGS. 4-10, map application module 110 create a ranked list including secondary map 600 based on highest overlap percentage.

At operation 1135, the system outputs instructions to display the ranked list on a digital display. In embodiments, and as described with respect to FIGS. 4-10, map application module 110 outputs instructions to display the ranked list on user interface 400.

At operation 1140, the system receives a user selection of one of the secondary maps. In embodiments, and as described with respect to FIGS. 4-10, map application module 110 receives a user selection, made by a user through user interface 400, of secondary map 600.

At operation 1145, the system receives a user selection of one of a plurality of parameters of the selected secondary map. In embodiments, and as described with respect to FIGS. 4-10, map application module 110 receives a user selection, made by a user through user interface 400, of the parameter (the number of grocery stores) of secondary map 600.

At operation 1150, the system applies applicable weighting maps to the distribution of parameters. In embodiments, and as described with respect to FIGS. 4-10, map application module 110 applies one or more weightings, such as the weightings resulting from lake 910 and/or forest 920 to the parameter (the number of grocery stores) of secondary map 600, to adjust the measure of the parameter of secondary map 600 based on uninhabitable areas such as lake 910 and/or forest 920.

At block 1155, the system uses a population density map in operation 1150. In embodiments, and as described with respect to FIGS. 4-10, map application module 110 applies the weightings resulting from a population density map to the parameter (the number of grocery stores) of secondary map 600.

At block 1160, the system uses a geographical feature map in operation 1150. In embodiments, and as described with respect to FIGS. 4-10, map application module 110 applies the weightings resulting from lake 910 and forest 920 to the parameter (the number of grocery stores) of secondary map 600 (the example used in the above description of operation 1150).

At block 1165, the system uses machine learning in operation 1150. In embodiments, and as described with respect to FIGS. 4-10, map application module 110 applies the weightings resulting from machine learning regarding prior uses of the weightings and/or prior user input relative to the weightings.

At operation 1170, the system calculates a weighted measure of parameter(s) for each region of the base map. In embodiments, and as described with respect to FIGS. 4-10, map application module 110 calculates a weighted measure of the parameter (the number of grocery stores) of secondary map 600 for each region of base map 500.

At operation 1175, the system applies a weighted measure of parameter(s) of the selected secondary map to the base map. In embodiments, and as described with respect to FIGS. 4-10, map application module 110 applies the weighted measure of the parameter (the number of grocery stores) of secondary map 600 for each region of base map 500.

At operation 1180, the system displays a measure of parameter(s) of the selected secondary map on the base map. In embodiments, and as described with respect to FIGS. 4-10, map application module 110 displays, on user interface 400, the measure of parameter (the number of grocery stores) of secondary map 600 for each region of base map 500.

In embodiments, a service provider could offer to perform the processes described herein. In this case, the service provider can create, maintain, deploy, support, etc., the computer infrastructure that performs the process steps of the disclosure for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the disclosure provides a computer-implemented method, via a network. In this case, a computer infrastructure, such as computer system/server 12 (FIG. 1), can be provided and one or more systems for performing the processes of the disclosure can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the disclosure.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    receiving, by a computing device, a base map, the base map being divided into a plurality of geographical base regions, each of the geographical base regions having a measure of a first parameter;
    receiving, by the computing device, a plurality of secondary maps from a library of maps, each of the secondary maps being divided into a plurality of geographical regions, each of the geographical regions having a measure of at least one secondary parameter;
    determining, by the computing device, a total overlap percentage for each of the secondary maps relative to the base map, the total overlap percentage for a particular one of the secondary maps being an average of overlap percentages of each of the geographical regions of the particular one of the secondary maps with the geographical base regions of the base map;
    creating, by the computing device, a ranked list of the secondary maps based on the total overlap percentage of each of the secondary maps;
    receiving, by the computing device, a selection of one of the secondary maps displayed in the list; and
    applying, by the computing device, the secondary parameter of the selected secondary map to each of the geographical base regions of the base map, the applying to a particular one of the geographical base regions being in accordance with the measure of the secondary parameter of the geographical region of the selected secondary map that overlaps the particular one of the geographical base regions more than any other one of the geographical regions of the selected secondary map.

2. The method of claim 1, wherein the computing device determines the overlap percentage of each of the geographical regions of the particular one of the secondary maps by determining which of the geographical regions of the particular one of the secondary maps has the greatest amount of overlap with each of the geographical base regions of the base map.

3. The method of claim 1, wherein the list includes only those secondary maps having a total overlap percentage above a threshold, the threshold being at least fifty percent.

4. The method of claim 1, wherein each of the geographical regions of the selected secondary map has a plurality of secondary parameters, the method further comprising receiving, by the computing device, a selection of one of the plurality of the secondary parameters of the selected secondary map.

5. The method of claim 1, further comprising outputting, by the computing device, instructions to display on a digital display the applied secondary parameter of the selected secondary map on the geographical base regions of the base map.

6. The method of claim 1, further comprising outputting, by the computing device, instructions to display on a digital display the ranked list.

7. The method of claim 1, wherein the retrieving of the secondary maps includes only those secondary maps that have an area hierarchy equal to an area hierarchy of the base map.

8. The method of claim 7, wherein the area hierarchy is at least one selected from the group consisting of: region, province, state, and county.

9. The method of claim 1, further comprising weighting, by the computing device, the measure of the secondary parameter of the secondary maps by combining a weighting map with each of the secondary maps.

10. The method of claim 9, wherein the combining comprises multiplying a factor of a parameter of the weighting map by the measure of the secondary parameter of the geographical regions of the secondary map.

11. The method of claim 10, wherein the weighting map is a population density map and the parameter of the weighting map is population density.

12. The method of claim 10, wherein the weighting map is a geographical feature map and the parameter of the weighting map is a geographical feature indicating areas that are non-inhabitable.

13. The method of claim 1, wherein the computing device includes software provided as a service in a cloud environment.

14. A computer program product comprising one or more computer readable storage media having program instructions collectively stored on the one or more computer readable storage media, the program instructions executable to:
    receive a base map, the base map being divided into a plurality of geographical base regions, each of the geographical base regions having a measure of a first parameter;
    receive a plurality of secondary maps from a library of maps, each of the secondary maps being divided into a plurality of geographical regions, each of the geographical regions having a measure of at least one secondary parameter;
    determine a total overlap percentage for each of the secondary maps relative to the base map, the total overlap percentage for a particular one of the secondary maps being an average of overlap percentages of each of the geographical regions of the particular one of the secondary maps with the geographical base regions of the base map;
    create a ranked list of the secondary maps based on the total overlap percentage of each of the secondary maps;
    receive a selection of one of the secondary maps displayed in the list; and
    apply the secondary parameter of the selected secondary map to each of the geographical base regions of the base map, the applying to a particular one of the geographical base regions being in accordance with the measure of the secondary parameter of the geographical region of the selected secondary map that overlaps the particular one of the geographical base regions more than any other one of the geographical regions of the selected secondary map.

15. The computer program product of claim 14, further comprising program instructions executable to display on a digital display the applied secondary parameter of the selected secondary map on the geographical base regions of the base map.

16. The computer program product of claim 15, wherein computing device determines the overlap percentage of each of the geographical regions of the particular one of the secondary maps by determining which of the geographical regions of the particular one of the secondary maps has the greatest amount of overlap with each of the geographical base regions of the base map.

17. A system comprising:
a processor, one or more computer readable storage media, and program instructions collectively stored on the one or more computer readable storage media, the program instructions executable to:
receive a base map, the base map being divided into a plurality of geographical base regions, each of the geographical base regions having a measure of a first parameter;
receive a plurality of secondary maps from a library of maps, each of the secondary maps being divided into a plurality of geographical regions, each of the geographical regions having a measure of at least one secondary parameter;
determine a total overlap percentage for each of the secondary maps relative to the base map, the total overlap percentage for a particular one of the secondary maps being an average of overlap percentages of each of the geographical regions of the particular one of the secondary maps with the geographical base regions of the base map;
create a ranked list of the secondary maps based on the total overlap percentage of each of the secondary maps;
receive a selection of one of the secondary maps displayed in the list; and
apply the secondary parameter of the selected secondary map to each of the geographical base regions of the base map, the applying to a particular one of the geographical base regions being in accordance with the measure of the secondary parameter of the geographical region of the selected secondary map that overlaps the particular one of the geographical base regions more than any other one of the geographical regions of the selected secondary map.

18. The system of claim 17, wherein each of the geographical regions of the selected secondary map has a plurality of secondary parameters, the system further comprising program instructions executable to receive a selection of one of the plurality of the secondary parameters of the selected secondary map.

19. The system of claim 18, wherein the overlap percentage of each of the geographical regions of the particular one of the secondary maps is determined by determining which of the geographical regions of the particular one of the secondary maps has the greatest amount of overlap with each of the geographical base regions of the base map.

20. The system of claim 19, further comprising program instructions executable to display on a digital display the applied secondary parameter of the selected secondary map on the geographical base regions of the base map.

\* \* \* \* \*